(12) United States Patent
Heidingsfeld

(10) Patent No.: US 7,765,894 B2
(45) Date of Patent: Aug. 3, 2010

(54) TORSIONAL VIBRATION DAMPER

(75) Inventor: Dietmar Heidingsfeld, Aachen (DE)

(73) Assignee: Rohs-Voigt Patentverwertungsgesellschaft mbH, Dueren (DE)

( * ) Notice: Subject to any disclaimer, the term of this patent is extended or adjusted under 35 U.S.C. 154(b) by 496 days.

(21) Appl. No.: 11/751,023

(22) Filed: May 20, 2007

(65) Prior Publication Data

US 2007/0265100 A1 Nov. 15, 2007

Related U.S. Application Data

(63) Continuation of application No. 10/100,834, filed on Mar. 18, 2002, now Pat. No. 7,341,523, which is a continuation-in-part of application No. 09/585,733, filed on Jun. 2, 2000, now abandoned.

(30) Foreign Application Priority Data

| Jun. 4, 1999 | (DE) | ................................. 199 25 487 |
| Aug. 27, 1999 | (DE) | ................................. 199 40 793 |

(51) Int. Cl.
 *F16F 15/12* (2006.01)
(52) U.S. Cl. ..................................................... 74/574.4
(58) Field of Classification Search ............... 74/572.2, 74/573.12, 574.4
 See application file for complete search history.

(56) References Cited

U.S. PATENT DOCUMENTS

| 1,840,655 A | 1/1932 | Carl |
| 4,395,809 A | 8/1983 | Whiteley |
| 4,936,434 A | 6/1990 | Clancey |
| 5,072,818 A | 12/1991 | Kuhne |
| 5,156,249 A | 10/1992 | Friedmann |
| 5,370,581 A | 12/1994 | Rohrle et al. |
| 5,377,962 A | 1/1995 | Ochs et al. |
| 5,503,595 A | 4/1996 | Rohrle |
| 5,513,731 A | 5/1996 | Matsuoka |
| 5,558,579 A * | 9/1996 | Tsuchiya et al. ........... 464/64.1 |
| 5,569,088 A | 10/1996 | Schierling et al. |
| 5,598,745 A | 2/1997 | Tsuchiya |
| 5,622,244 A | 4/1997 | Hansen |
| 5,690,199 A | 11/1997 | Annic et al. |
| 5,713,796 A * | 2/1998 | Fukamachi ................... 464/24 |
| 5,759,105 A | 6/1998 | Bochot et al. |
| 5,873,445 A | 2/1999 | Haberbusch et al. |

(Continued)

FOREIGN PATENT DOCUMENTS

DE  39 01 571  8/1990

(Continued)

*Primary Examiner*—Vicky A Johnson
(74) *Attorney, Agent, or Firm*—Collard & Roe, P.C.

(57) ABSTRACT

A torsional vibration damper has two mutually pivoted masses and a friction device that is active between the masses. This friction device can include a first friction device that is a spring friction device and an auxiliary friction device comprising at least one entraining wedge. The entraining wedge can function as dual wedge having at least two frictional surfaces for contacting at least one of the two mutually pivoted masses. There can also be at least one additional entraining wedge disposed parallel to the at least one entraining wedge inside of a chamber formed between the two mutually pivoted masses. The friction device and the auxiliary friction device frictionally couple the two mutually pivoted masses together.

33 Claims, 12 Drawing Sheets

U.S. PATENT DOCUMENTS

| | | | |
|---|---|---|---|
| 6,167,999 B1 * | 1/2001 | Reik et al. | 192/55.1 |
| 6,171,193 B1 | 1/2001 | Rohs et al. | |
| 6,416,416 B1 | 7/2002 | Rohs et al. | |
| 7,341,523 B2 * | 3/2008 | Heidingsfeld | 464/67.1 |

FOREIGN PATENT DOCUMENTS

| | | |
|---|---|---|
| DE | 42 35 636 | 4/1994 |
| DE | 44 20 934 | 4/1995 |
| DE | 198 17 906 | 5/1999 |
| EP | 0 863 330 | 9/1998 |
| WO | WO 99/22158 | 5/1999 |

* cited by examiner

TORSIONAL VIBRATION DAMPER

CROSS REFERENCE TO RELATED APPLICATIONS

This application is a Continuation application and hereby claims priority from U.S. application Ser. No. 10/100,834 filed on Mar. 18, 2002 now U.S. Pat. No. 7,341,523 wherein that application is a Continuation-In-Part Application of U.S. patent application Ser. No. 09/585,733 filed on Jun. 2, 2000 now abandoned, wherein that application hereby claims priority under 35 U.S.C. 119 for German Patent Application No. 199 25 487.7 filed on Jun. 4, 1999 and German Patent Application No. 199 40 793.2 filed on Aug. 27, 1999, wherein the disclosures of all of these applications are hereby incorporated herein by reference in their entirety.

BACKGROUND OF THE INVENTION

The invention relates to a torsional vibration damper with two mutually pivoted masses.

Torsional vibration dampers are known in numerous specific embodiments. One key focus in the structural configuration of such torsional vibration dampers is that the damping properties of such torsional vibration dampers be suitably influenced. For example, there is a requirement that only a little damping arise between the masses or plates at low rotational amplitudes, while a high level of damping is desired at large amplitudes. At the same time, a high damping is desired at high rotational velocities, while only a little damping is to take place at low rotational speeds.

SUMMARY OF THE INVENTION

One object of this invention is to provide a torsional vibration damper that enables a high variability in damping characteristic adjustment by introducing the simplest structural modification possible.

As a solution, the invention proposes a torsional vibration damper with two mutually pivoted masses, in which a friction device is provided that encompasses an entraining wedge and is active between the masses.

In this connection, the term "entraining" denotes a component arranged between the two masses so that the component can follow this movement, within the framework of a potential relative movement of the two masses relative to each other, if the friction is neglected. In other words, an entraining component does not impede the relative movement between the two pivoted masses of the torsional vibration damper if friction is neglected.

In addition, the term "wedge" in the present context describes a component with two opposed surface areas whose distance varies along the opposed surface areas. In particular, such a wedge can be provided between two frictional surfaces whose distance varies along the periphery of the torsional vibration damper. The distance of the frictional surfaces advantageously changes acting in the same direction like the distance of the corresponding wedge surfaces, wherein the selected degree of changes need not be identical, but can be adjusted to the respective requirements.

In particular, the wedge can be arranged between two frictional surfaces with essentially axial surfaces. Such an arrangement produces an essentially radial flow of the forces arising during the wedging process. Such radially directed forces are particularly easy to offset given essentially rotationally symmetrical torsional vibration dampers.

Complex surface calculations and surface processing is not necessary if at least one of the surfaces, either the wedge surface or a frictional surface, is shaped as a partial cylinder where the wedge and frictional surface interact. In the present context, the term partial cylinder describes a surface area whose configuration corresponds to the generated surface of a cylinder.

On the one hand, at least one of the cylindrical surfaces can exhibit a cylindrical axis that corresponds to the primary rotational axis of the torsional vibration damper. As directly evident, this makes it possible to generate a surface that enables entrainment.

On the other hand, at least one of the cylindrical surfaces can be displaced parallel relative to the rotational axis of the torsional vibration damper. This makes it possible to prepare surfaces with a variable distance in a structurally relatively easy way, in particular if these are allocated to another partially cylindrical surface with another radius and/or another axial position.

In like manner, the wedge can exhibit at least a partially cylindrical wedge surface. In this case, the radius can reflect a corresponding surface area of a corresponding frictional surface that the wedge abuts. As a result of the identical radius, the wedge can then interact with the frictional surface over a relatively large surface, which makes it possible to achieve advantageous frictional properties.

The large bandwidth relative to the damping characteristic makes the friction device according to the invention particularly suitable as an auxiliary friction device for a torsional vibration damper wherein both masses are linked to each other via at least one spring-friction device. In such a case, the torsional vibration damper hence encompasses a spring-friction device on the one hand, which exhibits an elastic righting moment in the direction toward a rest position of the torsional vibration damper, and also damping properties due to the friction, and a friction device according to the invention with an entraining wedge as a separate component on the other hand.

The friction device is advantageously rigid except for the intrinsic elasticity of the wedge and corresponding frictional surfaces that interact with the wedge. This means that the friction does not encompass any spring-elastic auxiliary device, such as flat spiral springs or spring clips.

In particular, the wedge according to the invention can be designed as a dual wedge. This makes it possible to take relatively easy structural measures to anticipate for any torsional vibrations that can arise in various rotational directions. In addition, such a dual wedge allows the relative movement of the two masses of the torsional vibration damper to initiate a tilting motion on the part of the dual wedge that advantageously influences a wedging effect or frictional effect.

The dual wedge preferably is essentially shaped like a kidney with two opposed surfaces that are not parallel to each other. Such a shape is relatively compact, and can hence absorb relatively large forces. In addition, such a shape is structurally easy to adapt, thereby enabling entrainment.

The dual wedge can exhibit at least two partially cylindrical, spaced wedge surfaces with an essentially identical radius. Such surface areas can easily abut a continuous cylindrical frictional surface of the remaining torsional vibration damper, which makes it possible to set up the overall arrangement in a structurally relatively easy manner.

In particular, the two wedge surfaces can be formed around the same axis, so that the dual wedge with both partially cylindrical wedge surfaces can abut a continuous cylindrical frictional surface.

On the other hand, the two wedge surfaces can also be formed around axes displaced parallel to each other. This ensures that the dual wedge can abut the frictional surface with as large a surface as possible when tilted.

A recess can be provided between these two wedge surfaces, making it possible to avoid a tilting and discontinuous transition between two surface areas abutting a frictional surface. In addition, it is possible to provide a partially cylindrical connecting surface with a smaller radius than that of the two wedge surfaces between these two wedge surfaces. This also makes it possible to reduce discontinuities, especially if the same tangent is selected at the transition between the wedge surface and connecting surface.

In particular, the dual wedge can be arranged or designed so that it executes a tilting movement relative to the axis of the torsional vibration damper during a relative movement of the two masses. Suitable surface areas of the dual wedge can then be brought into frictional contact with corresponding frictional surfaces as the result of such a tilting movement.

The wedge can be arranged in a chamber filled at least partially with a viscous additive such as lubricating grease so that the friction device already initiates a damping even at the lowest twisting angles, while still keeping this damping at a sufficiently low level in a controlled manner. In this case, the viscous additive ensures the necessary initial force. In particular, such an initial force reliably ensures that the wedge will not be entrained in an undefined manner before its wedging and self-reinforcing effect sets in. The viscous additive permits a velocity-dependent friction that is already effective even at the lowest vibration amplitudes. In addition, this arrangement reliably prevents any unnecessary free play from arising that would influence damping in an unforeseeable way.

The wedge can exhibit at least one projection. This makes it possible to increase resistance to shearing forces of the viscous additive, which correspondingly increases the overall effect of the viscous additive. The enhanced effect stems directly from the larger working surface generated by such a projection. In addition, the projection generates increases spatial volume for receiving viscous additive in a space enveloping the wedge or chamber enveloping the wedge.

The at least one projection is preferably provided on a side of the wedge that is not used as the wedge surface. In this way, the wedge surface that can become active is not reduced, the advantageous effects of such a projection can still be realized.

In particular, the projection can point in an axial direction, which gives rise to surface areas pointing in a peripheral direction that interact to a particularly great extent with the viscous additive, and can ensure an additional friction on the walls of a chamber enveloping the wedge that does not impair a wedging effect exerted in a radial direction.

The torsional vibration damper can be relatively easily assembled or fabricated by covering the chamber at least partially by a sheet at least on a radial side. In this connection, the term radial surface describes a radial side of the chamber that can be covered or sealed by a radially directed surface. Accordingly, the term axial surface describes a surface that exhibits a surface component that is parallel to the axis of the torsional vibration damper.

It is also possible to cover the chamber at least partially by a sheet at least on an axial side. This also makes it possible to advantageously simplify the assembly or manufacture of the torsional vibration damper. In particular, these sheets are easy to mold, e.g., with non-rotationally symmetrical cylindrical shapes or the like.

For reasons of stability or to enable a connection with other components, the sheet can have a flanged edge. In particular, the sheet can be flanged so that it is fixed to one of the masses of the torsional vibration damper via the flanged edge. For example, the flanged edge can form an essentially radial frictional connection between the sheet and the mass.

Of course, such a flanged edge, in particular if it is used for fixation purposes in the manner described above, is also advantageous in itself, apart from the remaining features of the torsional vibration damper. In such an arrangement, the sheet can initially be positioned at the corresponding mass, and subsequently be flanged so as to produce this kind of frictional engagement between the sheet and mass. The sheet can be pre-flanged and then positioned accordingly, before a subsequent flanging results in such a frictional engagement.

Both sheet covers should be made out of the same material. If the torsional vibration damper has at least two chambers, at least one side of which is covered at least in part by a sheet. The chambers and sheet covers should be designed so that the one sheet can be arranged radially inside the other sheet, without the two sheets overlapping each other. This applies in particular for chambers that are covered by sheets running around the axis of the torsional vibration damper.

In this case, the term "in a stretched state" means that any bends, moldings and the like are regarded as having been removed from the sheets.

In such arrangements, it is possible to manufacture both sheet covers out of the same blank, or to manufacture one sheet cover out of a blank out of which a sheet cover corresponding to the second sheet cover was fabricated. This makes it possible to save in material quantities required to manufacture the sheet covers, since less waste accrues.

If the sheets are molded out of a single blank, they can then be subjected to shaping, if necessary in a single operation as well.

While the sheet covers can be made out of the same stock or blank, these sheets can be made with more than one blank but using the same type of material.

Of course, such an arrangement or manufacturing procedure for a torsional vibration damper is also advantageous even apart from the remaining features of the torsional vibration damper as long as two chambers are to be covered by sheets. This holds true in particular when the sheets traverse around the sheets of the torsional vibration damper, and the chambers are provided at various radial distances of the torsional vibration damper.

In addition, such a sheet to be rigidly connected with one of the masses can be fixed between two of these structural components. For example, this can be done via a screwed connection that fixes both structural components to each other. As a result, no extra operation is necessary for the fixation process. The simplified assembly achieved as a result justifies a higher outlay needed to attain an increased accuracy required by the rise in manufacturing tolerances. This holds true in particular when the two structural components form a bearing shell, preferably for the second mass. In this case, the sheet can form at least one side of the bearing shell. Since additional work must often be performed for a bearing shell to offset assembly tolerances, the otherwise undesired tolerance increases caused by the undesired mold seam in the bearing shell can be offset.

Such a sheet can also be secured in a groove. Preferably, such a groove is designed radially directed toward the inside. For assembly, the sheet only needs to be positioned and pressed at least partially into the groove. To increase the seal of the pressing sheet, a sealing means can be introduced between the sheet and the corresponding structural component that holds this sheet. This means can be silicone rubber or another rubber-elastic sealant. A surface or paper seal can also be provided.

Of course, fixing the sheet in this way is also advantageous independently of the other features of the torsional vibration damper.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
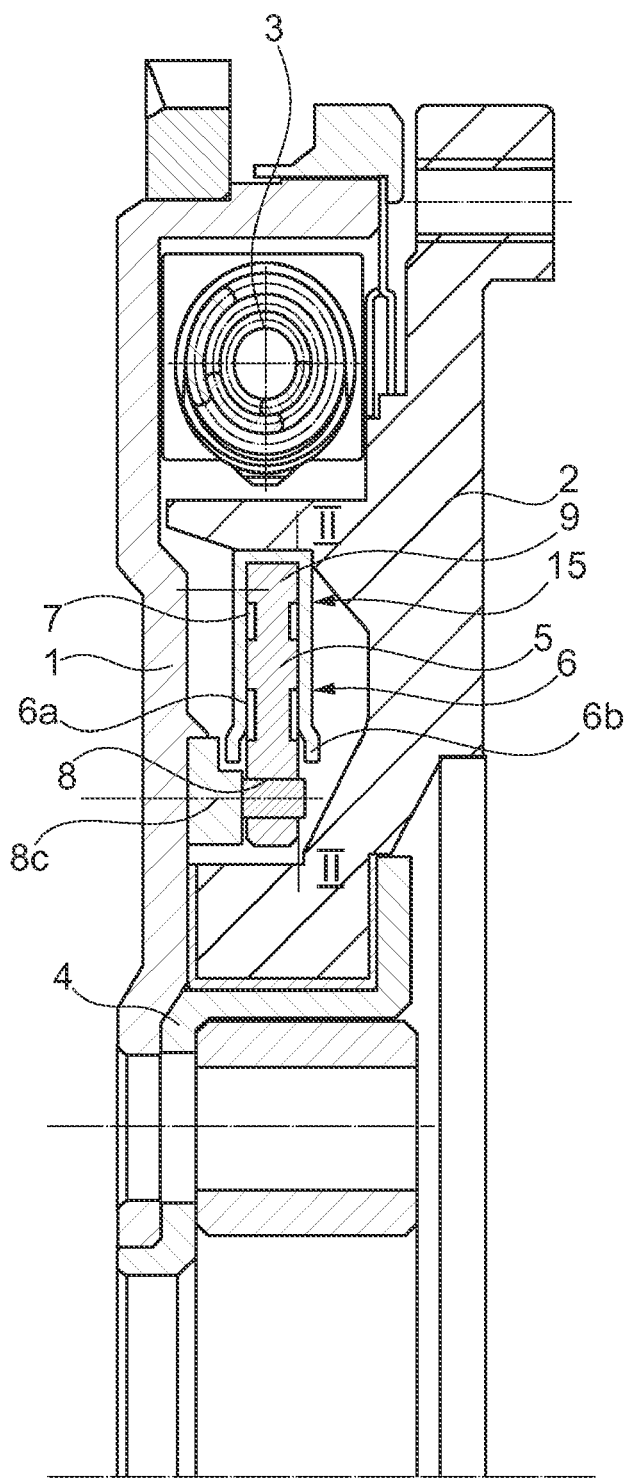
FIG. 1 shows a torsional vibration damper according to the invention, taken along section I-I line shown in FIG. 2.

Referring to the drawings, as shown in FIG. 1 each of the torsional vibration dampers shown in the drawings has a primary mass or plate 1 and a secondary mass or plate 2, which are linked with each other via a spring-friction device 3. Spring-friction device 3 forms a first structural component of primary mass 1. Primary mass also has a second structural component 4. In this case, secondary mass 2 is pivoted relative to primary mass 1 in a bearing shell formed by second structural component 4 of primary mass 1. Such torsional vibration dampers are normally known in the art. In addition to spring friction device 3, the torsion vibration damper comprises an auxiliary friction device.

The auxiliary friction device is in the form of wedges 5 with an axial surface disposed between, and contacting two frictional surfaces 7 and 8 that are arranged in a corresponding chamber 6. Chamber 6 is formed when primary mass 1 and secondary mass 2 are coupled together.

Figure 2:
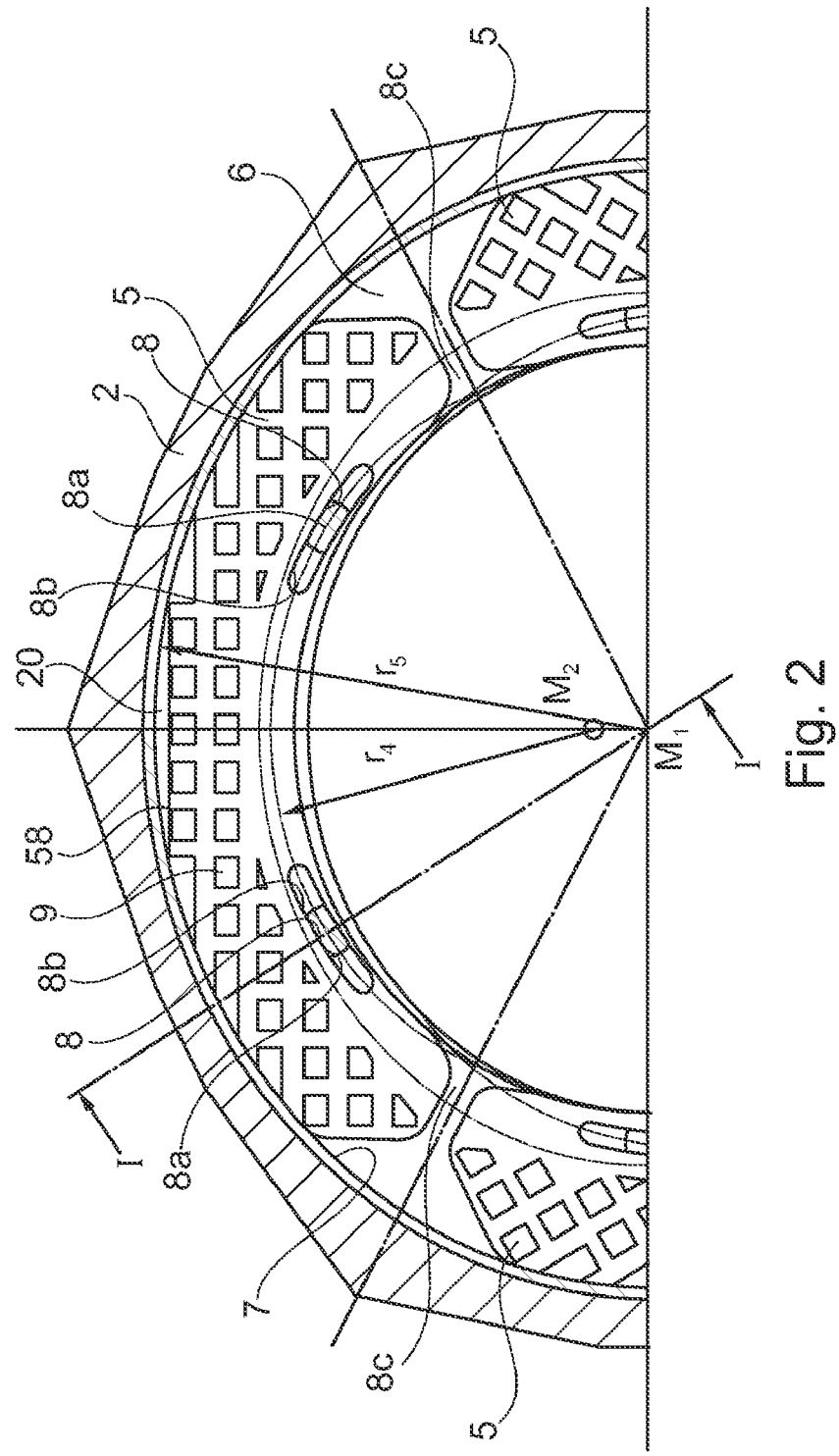
FIG. 2 shows the torsional vibration damper according to FIG. 1, taken along the section II-II through the torsional vibration damper axis.
Figure 6:
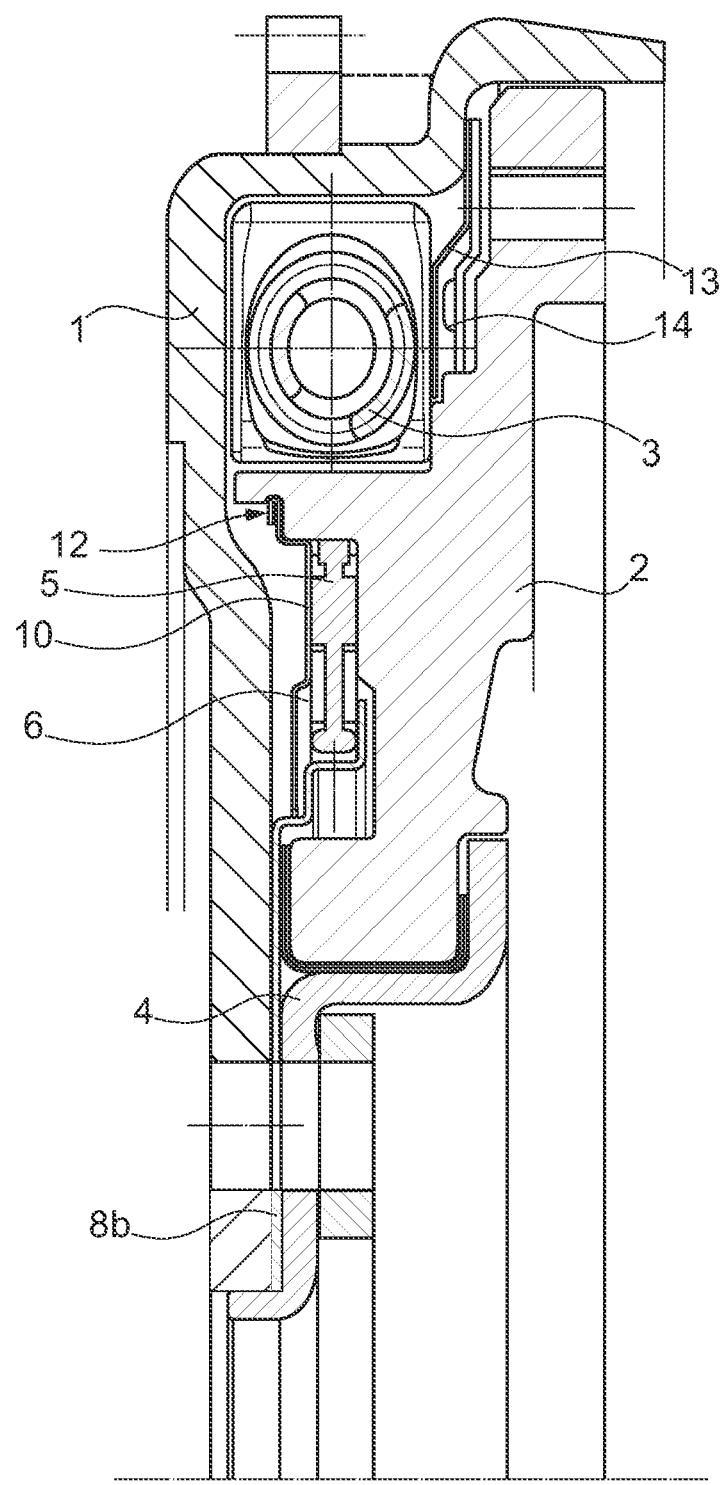
FIG. 6 shows a third torsional vibration damper, in a similar view as in FIG. 1 and FIG. 3.

Frictional surfaces 7 is disposed on secondary mass 2 within chamber 6 at radius r5 (See FIG. 2) lying radially to the outside, against which wedges 5 abut. In addition, as shown in FIG. 1, surrounding wedges 5 is a U-shaped member 15 including elements 6a and 6b. This unshaped member 15 can either be a separate element, or incorporated into the structure of wedges 5 by any method known in the art such as molding or pressing. Thus, wedges 5 are frictionally coupled to frictional surface 7 in that wedges 5 can either indirectly contact frictional surfaces 7 as shown in FIG. 1 or directly contact frictional surfaces 7 as shown in FIG. 6.

As is directly evident, these wedges 5 can also have two wedge surfaces disposed around the same rotational axis spaced apart by a recess 20. Wedges 5 can be entrained as desired given a negligible friction, in particular in the range of amplitudes enabled by spring devices 3. Thus, the first spring friction device and the auxiliary spring friction device link the two masses 1 and 2 together.

Frictional surfaces 8 are associated with primary mass 1 within chamber 6, and are frictionally coupled to surfaces on wedge 5 in that frictional surfaces 8 can contact wedge 5 either directly or indirectly via friction forces. Frictional surfaces 8 are partially cylindrical and partially offset relative to the rotational axis of the torsional vibration damper. In a first embodiment, frictional surfaces 8 are provided on catches 8a in the embodiment shown in FIGS. 1 and 2 these surfaces 8 engage the corresponding recesses in wedges 5. Carrier ring 8c also has catches 8a. In the embodiments shown in FIGS. 3 to 6, these frictional surfaces 8 are located on a profiled shim 8b situated between primary mass 1 and structural component 4 of primary mass 1.

Figure 5A:
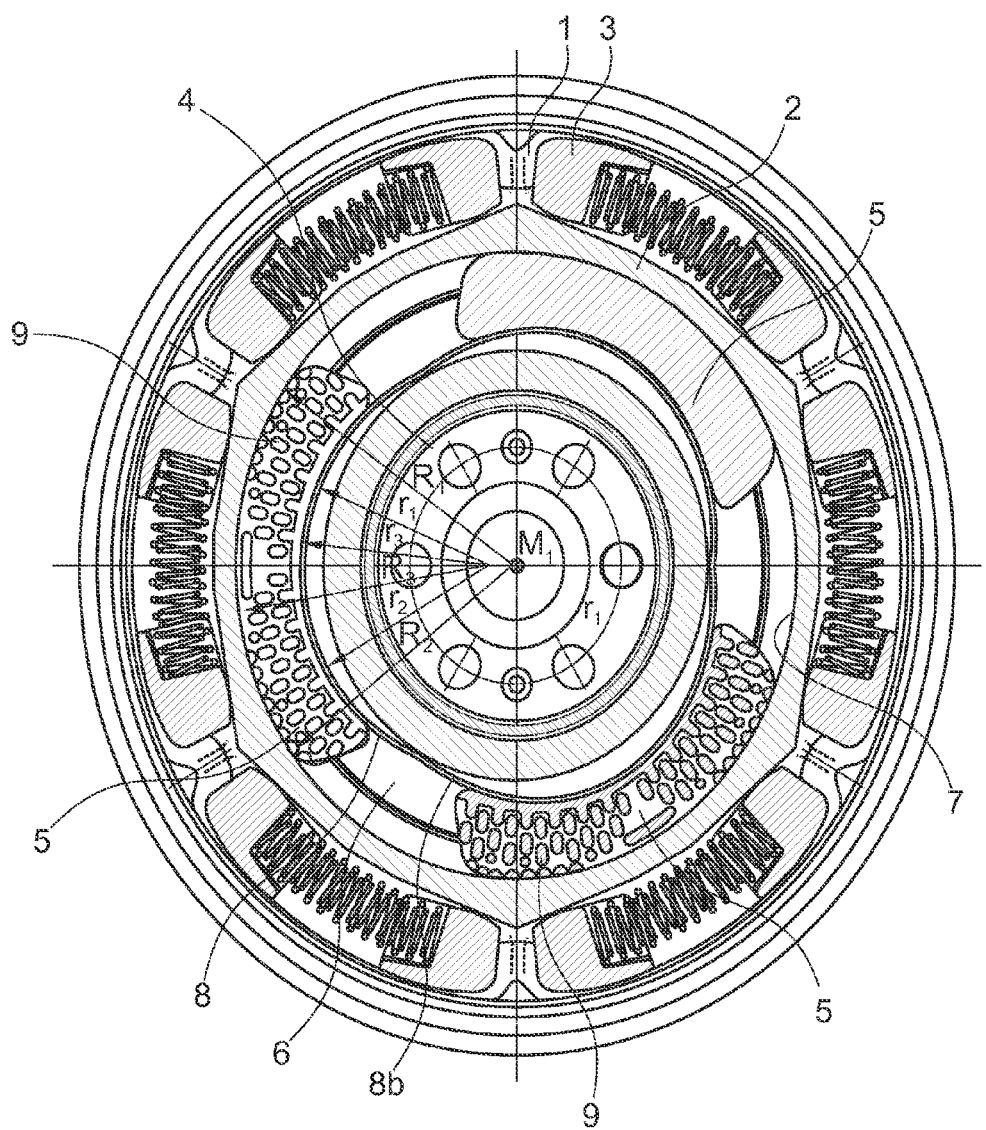
FIG. 5A shows the torsional vibration damper according to FIG. 3, as a section through the torsional vibration damper axis.
Figure 5B:
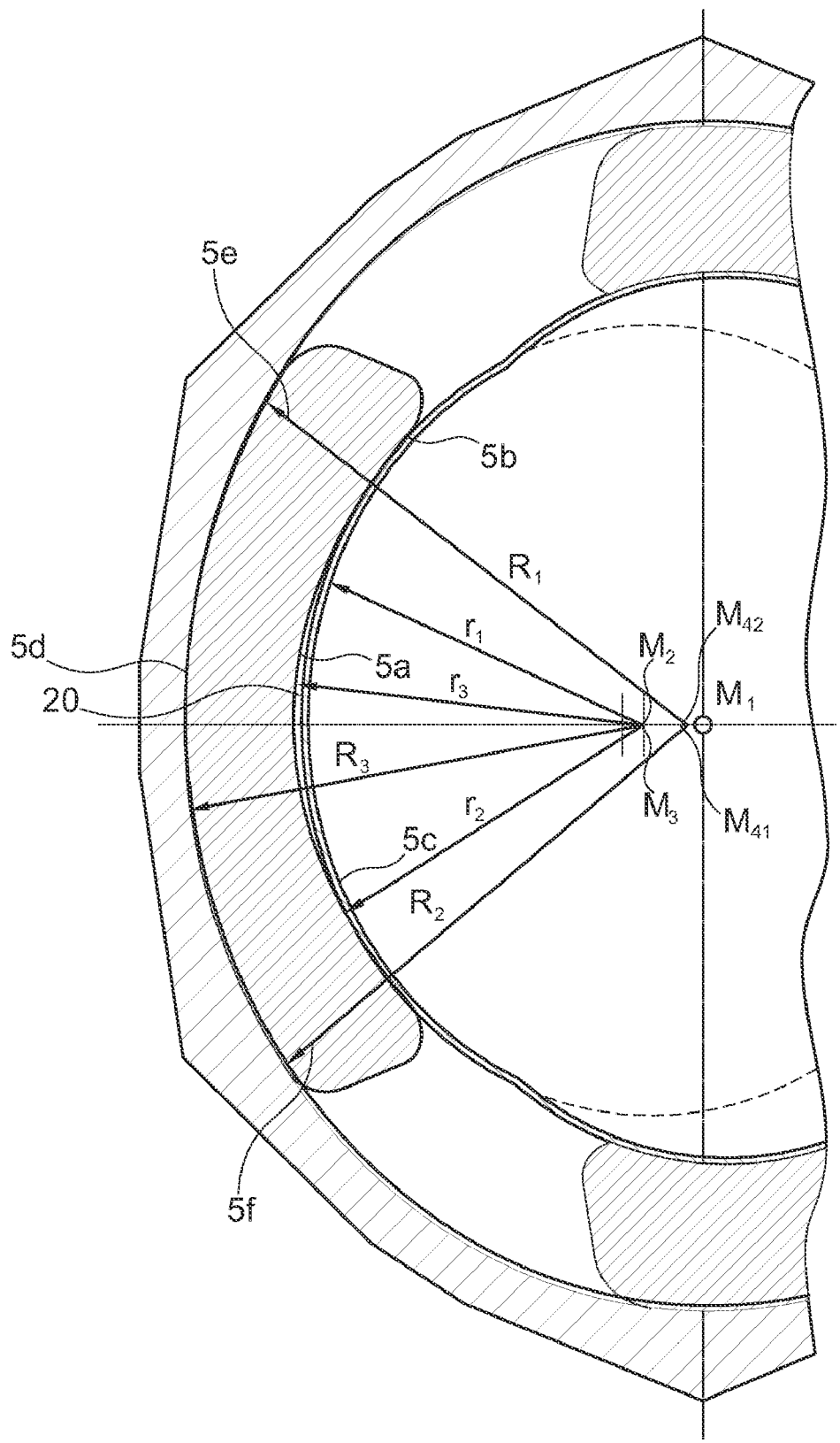
FIG. 5B shows a blown up section of FIG. 5A.
Figure 5C:
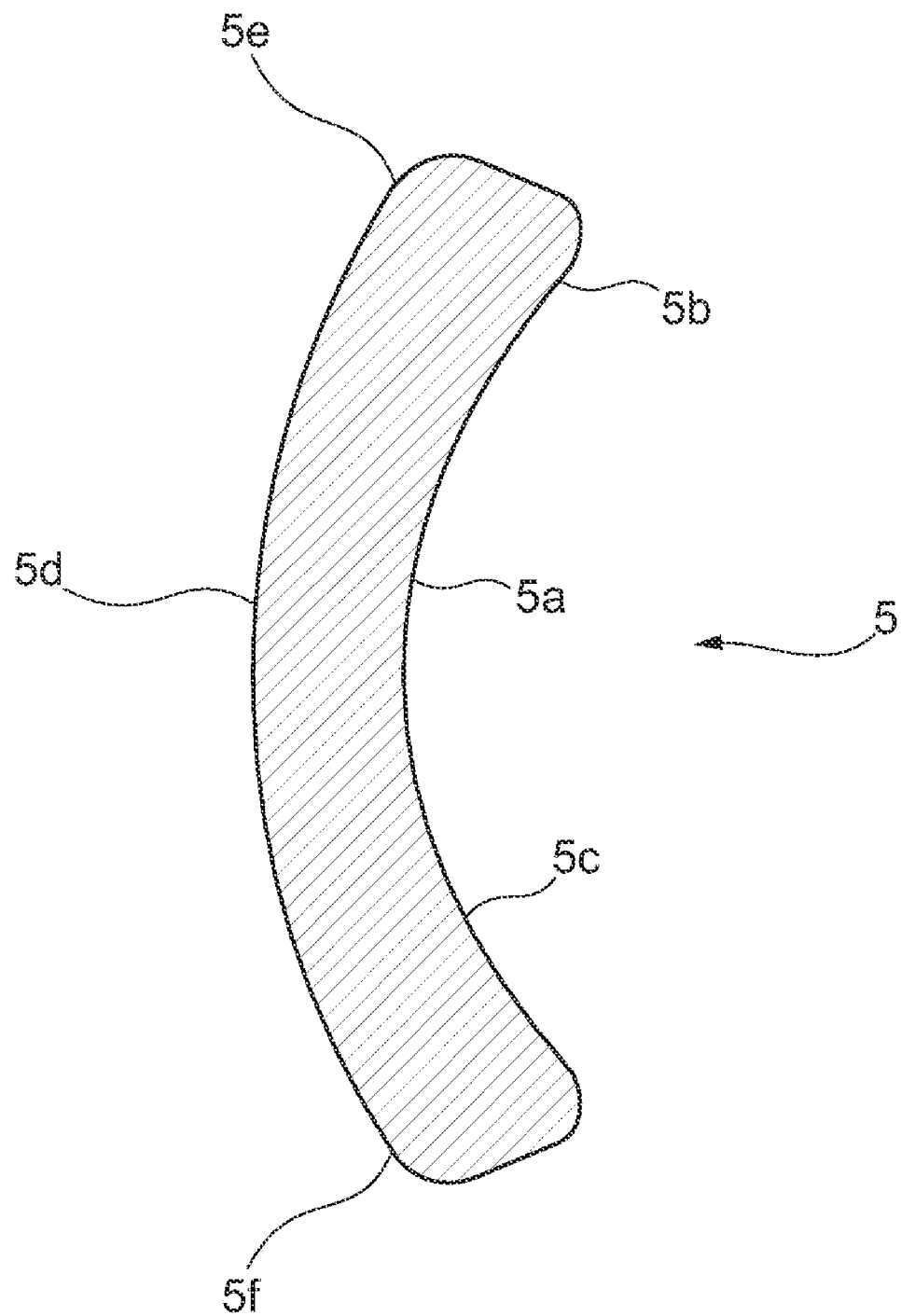
FIG. 5C shows a cross-sectional view of the wedge shown in FIGS. 5A and 5B.

As shown in FIGS. 5A, 5B and 5C each of wedges 5 is designed as a dual wedge. Wedges 5 are a dual wedge because surfaces 5b and 5e constitute a first wedge and surface 5c and its opposed surface 5f constitute a second wedge. For example, if you cut the dual wedge 5 in the middle, you get two wedges only working in one direction. This dual wedge has six partially cylindrical wedge surfaces 5a, 5b, 5c, 5d, 5e and 5f. Wedge 5 is considered a wedge because it does not have two opposed concentric substantially parallel surfaces. Instead, wedge 5 has these six different surfaces wherein for example, inner surface 5b does not run parallel to outer surface 5e. Surface 5a corresponds to inner radius r3 starting at center M3, and functions as a cylindrical connecting surface. Surfaces 5b and 5c are frictional surfaces and correspond to inner radii r1 and r2 starting at center M2 respectively. Surface 5d corresponds to outer radius R3, while surface 5e corresponds to outer radii R1, while surface 5f corresponds to radius R2 starting at center M41. The outer radii R1 and R2 are identical to the wedge surfaces 5d, 5e and 5f lying radially on the outside of wedge 5. These wedge surfaces have a similar radius as frictional surface 7 lying radially to the outside. However, the cylindrical axis is shifted parallel relative to the axis of the torsional vibration damper for wedge surfaces 5e and 5f. Specifically, the radii R1 and R2 are substantially similar or identical to the radius of frictional surface 7, whereas the radius R3 is a little bit smaller than the radius of the frictional surface 7 to meet a required play. The cylindrical axis of the wedge surfaces 5e and 5f corresponding to radii R1 and R2 are marked by centers M41 and M42 respectively. This shift is shown in FIG. 5A wherein outer radius R1 has a different central axis than that of radius r1.

As evident, the friction device has no resilient structural components, so that it is rigid except for the intrinsic elasticity of wedges 5 or the structural components comprising frictional surfaces 7 and 8.

Dual wedges 5 are essentially shaped like a kidney, having at least two partially spaced inner wedge surfaces 5b and 5c with an essentially identical radius. The offset cylindrical axes of the outside wedge surfaces 5e and 5f cause dual wedges 5 to tilt during a relative movement of primary mass 1, having structural component 4, and secondary mass 2. The wedges have transition areas between the outside wedge surfaces of each dual wedge 5. These are designed as rectangular surfaces 5B in the embodiment shown in FIGS. 1 and 2, while a cylindrical surface 5d with a slightly smaller radius R3 than that of the frictional surface 7 is selected in the embodiment shown in FIGS. 3 to 6. A bonding surface is situated in terms of its radius and axis between said surfaces 5d and 5e so that the same angle of inclination or tangent arises at the transition between the bonding surface and wedge surface to assure a smooth transition.

For example, there is a smooth transition if you follow the outside surface of the kidney wedge 5. Starting from surface 5e towards surface 5d, there is one point where actually a corner would occur when radii R1 and R3 meet. This transition would lead to jerks or abrupt movements. Therefore, between surfaces 5e and 5d, a bonding or transition surface is used which ensures a smooth transition by having the radius R1 near surface 5e and the radius R2 near surface 5d. The tilting movement leads to a corresponding movement of the centers M2, M3 as well as M41 and M42. The geometrical dimensions are chosen so that at either M41 or M42, at least nearly, reaches M1 during the tilting process.

Chamber 6 is partially filled with a viscous additive. In addition, each of wedges 5 have projections 9 that point in an axial direction. This gives rise to surface areas that counteract the shearing forces of the viscous additive, so that dual wedge 5 becomes active without any tolerance. Projections 9 are designed so that they extend up to radial walls of chamber 6, so that friction is present at these locations too. Gaps are formed between projections 9, which enable an increased absorption capacity for the viscous additive.

Figure 3:
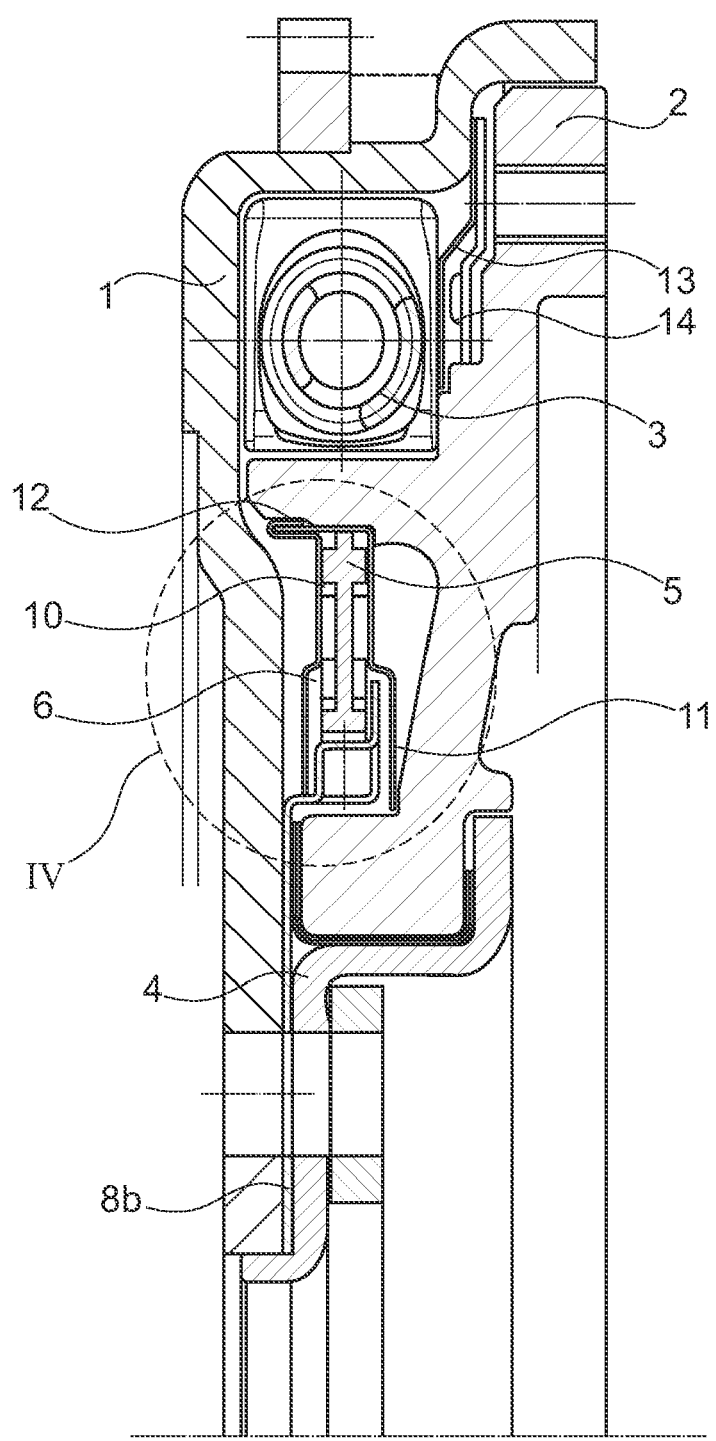
FIG. 3 shows a second torsional vibration damper according to the invention, similar to the view as in FIG. 1.
Figure 4:
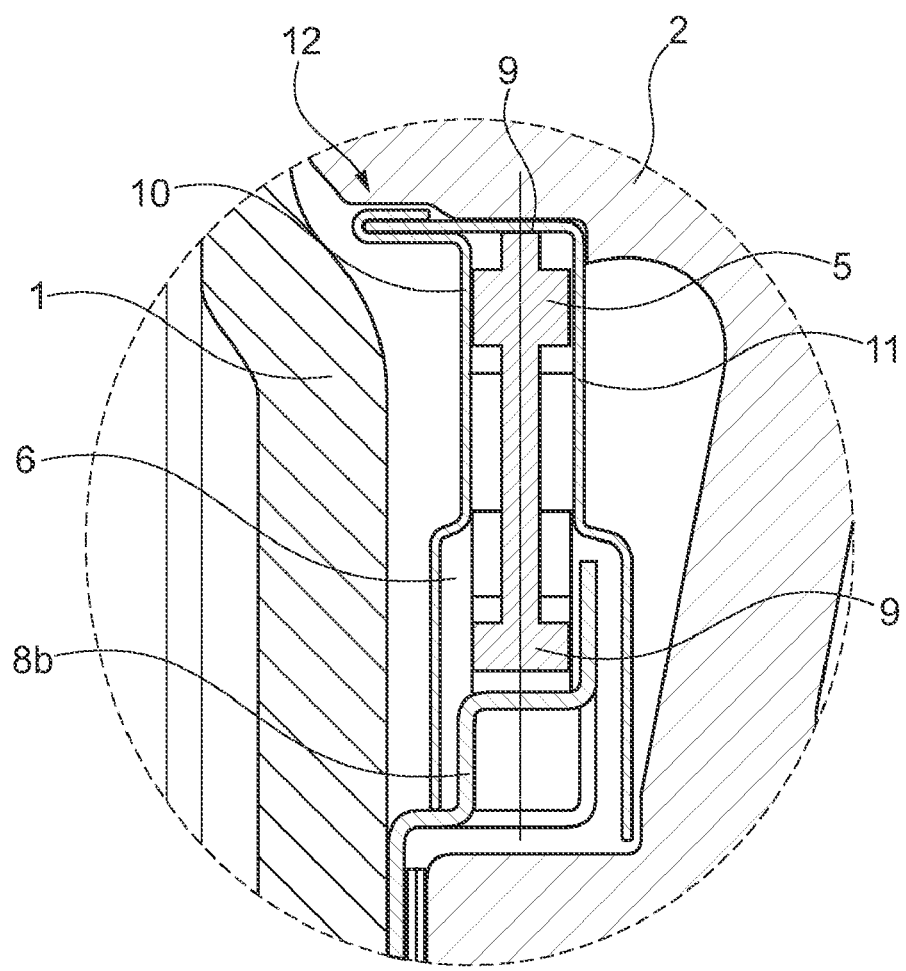
FIG. 4 shows a magnification of section IV-IV in FIG. 3.
Figure 9:
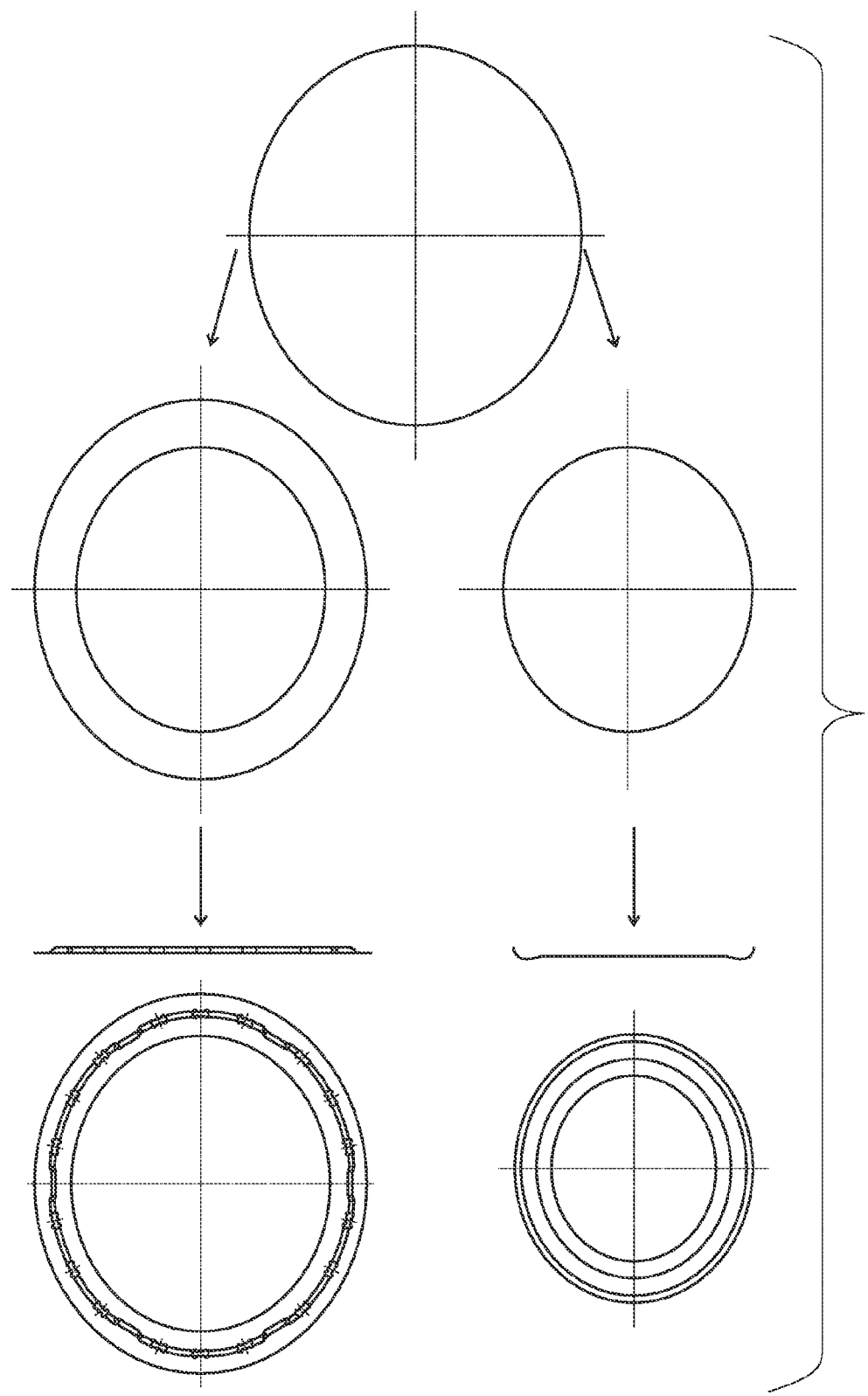
FIG. 9 shows the process for forming sheets in a stretched state.

As evident from FIGS. 3, 4 and 6, chamber 6 in the embodiment shown in FIGS. 3 to 6 is bounded by sheets 10 and 11 in axial directions. These sheets have a flanged edge 12, wherein this flanged edge 12 forms a radial frictional contact with secondary mass 2, and fixes sheets 10 or 11 to secondary mass 2. FIG. 9 shows the process for forming sheets 8a, 10 or 11 in a stretched state.

In this case, FIG. 9 shows a process for forming sheets which starts with a round cover which is cut out from a blank. Next, this one piece is cut similar to a doughnut wherein a central hole is cut from the sheet with a second piece existing as an outer ring. Next, these sheets are worked into their final form for coupling to the necessary components.

In the embodiment shown in FIGS. 3 to 5, the two sheets 10 and 11 are first pre-flanged during a pre-assembly process. Subsequently, sheets 10 and 11 are positioned against secondary mass 2 in the desired manner. Only after this occurs, is flanged edge 12 completed, and frictional contact established between sheets 10 or 11 and secondary mass 2.

The sheet is attached in a similar way in the embodiment shown in FIG. 6. Here as well, the frictional contact between secondary mass 2 and sheet 10 is generated via flanged edge 12 only after sheet 10 has been positioned.

In the embodiments shown in FIGS. 3 to 6, sheet 10 and sealing sheet 13 for spring-friction device 3 consists of the same material wherein sheet 10 is arranged radially inside the other sheet in a stretched state without the two sheets overlapping each other. Sheet 8b and a cover sheet 14 of spring-friction device 3 are both made out of the same material as well. As evident, from the process shown in FIG. 9, sheets 10 and 13 or 8b and 14 can be made out of the same blank, so that no additional material is required for sheets 8b or 10. In this regard, only the sheet as an additional chamber border is of importance in terms of material outlay for the friction device according to the invention in the embodiment shown in FIGS. 3 to 5. In the embodiment shown in FIG. 6, the secondary mass is formed in the same manner, so that no additional material is required for chamber 6 formation.

Figure 7:
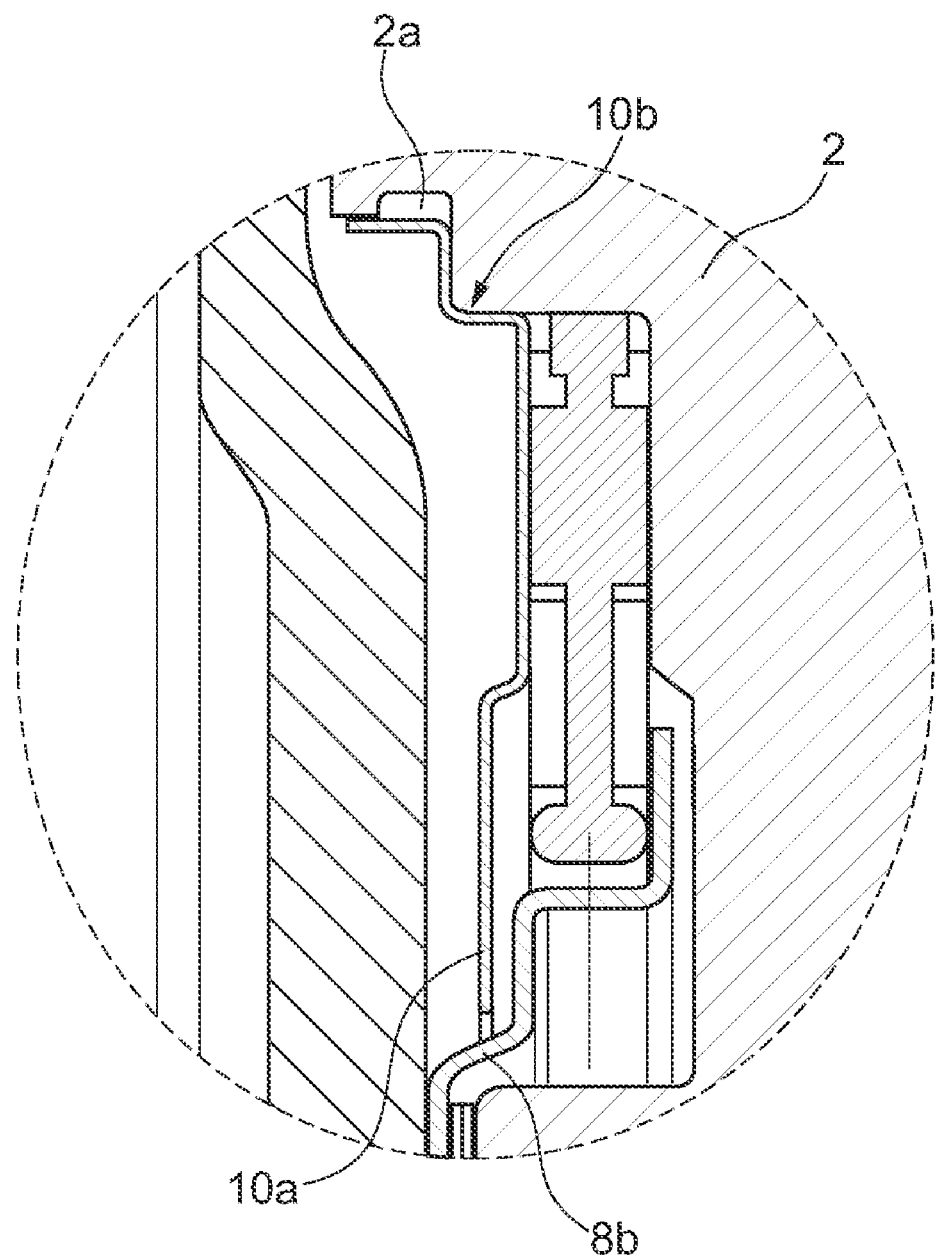
FIG. 7 shows a fourth torsional vibration damper, in a similar view as in FIG. 4, in which a cover sheet is not yet attached.
Figure 8:
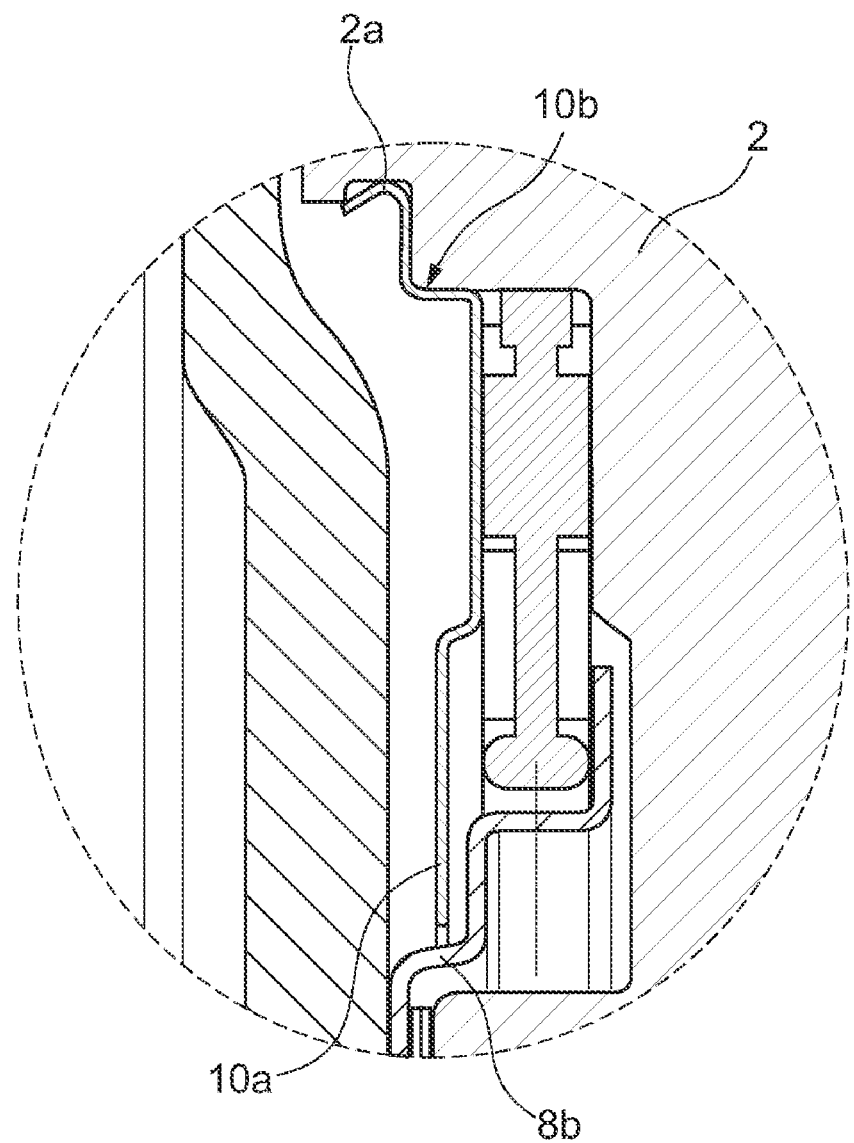
FIG. 8 shows the torsional vibration damper according to FIG. 7 after pressing in a cover sheet.

In the embodiment shown in FIGS. 7 and 8, a sheet 10a is arranged in a groove 2a of secondary mass 2. In this case, FIG. 7 shows the arrangement before pressing, i.e., immediately after sheet 10a has been brought to its assembly position. FIG. 8 shows the arrangement after sheet 10a has been pressed into groove 2a. Since the sheet is pressed in like this at only specific positions distributed around the periphery, FIG. 7 shows the arrangement of the peripheral positions at which no pressing takes place. In this arrangement, a sealant, e.g., silicone rubber, is introduced in a bend 10b of sheet 10a prior to assembly to achieve a better seal.

Figure 10:
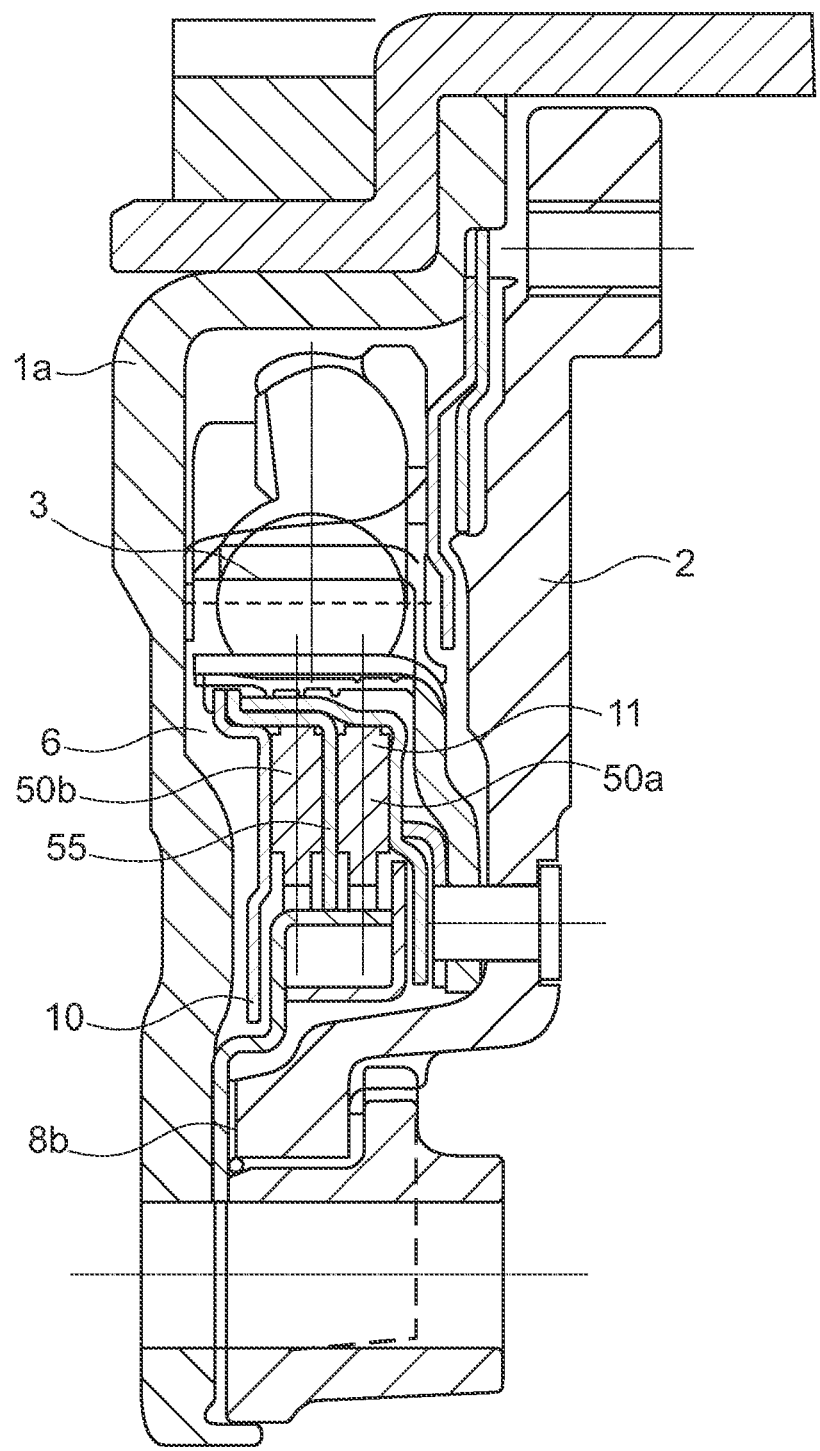
FIG. 10 shows another embodiment of the invention wherein in this embodiment two wedges are disposed in the chamber.

FIG. 10 shows another embodiment of the invention wherein in this embodiment, there is a primary mass or plate 1a, secondary mass or plate 2, a first friction device 3 and a second friction device comprising two wedges 50a and 50b substituting for existing wedge 5. These two wedges 50a and 50b are set parallel to each other inside of chamber 6 and set apart by spacer sheet 55. Just as with wedges 5 in FIGS. 1-8, wedges 50a and 50b are in either direct or indirect frictional contact with primary mass 1 and primary mass 2 and are enclosed by sheets 8a, 10 and 11.

For example, primary mass 1 is in optional frictional contact with wedges 50a and 50b via sheet 8b, while secondary mass 2 is in optional frictional contact with wedges 50a and 50b via sheet 11. The existence of two parallel wedges leads to much higher frictional forces as well as much higher hydrodynamic damping forces in comparison to one set of wedges. Additionally, the radii of each of wedges 50a and 50b may be adjusted on a wider range according to the wishes of the car manufacturer.

The dual wedge shaped elements 50a and 50b as well as wedges 5 have a double function. During high excitation frequencies, with smaller angular amplitudes between masses 1 and 2, dual wedges 50a and 50b perform a rocking motion or tilting motion without free play within the grease. This motion transforms only a small amount of damping energy.

Large movements, can also occur such as those caused by jolts or load alterations between coasting and load such as a clutch engagement jerk, or when passing through resonance levels, wherein the engine starts and stops at extremely low engine speeds. These large movements cause the outer edges of the dual wedges to be pressed against the machine surface and to be pulled along by the eccentric cap. The viscous shear forces generated by the side walls on the outer contour by the leading effect of the wedge geometry. Thus, this develops the speed dependent hysteresis torque to develop. This design results in a smooth increase in damping torque in contrast to more common Coulomb-type friction damping devices.

With these two parallel wedges, it is possible to use different kinds of dual wedges 5, wherein these wedges 5 differ by material or form to achieve the desired vibration damper. In addition, it is also possible to build sets of wedges in series rather than in parallel.

Accordingly, while only a few embodiments of the present invention have been shown and described, it is obvious that many changes and modifications may be made thereunto without departing from the spirit and scope of the invention.

What is claimed is:

1. A tortional vibration damper, comprising:
   a) at least two mutually pivoted masses being mounted rotatably about an axis;

b) at least one spring friction device linking said at least two mutually pivoted masses together, said spring friction device comprising at least one spring element and at least one friction device wherein said at least one spring friction device comprises at least one wedge having at least one projection that points in an axial direction; and c) at least two chambers, wherein said at least one spring element is arranged in a first of said at least two chambers and said at least one friction devise is arranged in a second of said at least two chambers; wherein said second chamber is at least partially filled with a viscous additive.

2. A torsional vibration damper according to claim 1, wherein said spring friction device comprises a wedge and wherein said spring friction device is rigid except for an intrinsic elasticity of said wedge and said frictional surfaces.

3. A torsional vibration damper according to claim 1, wherein said at least one spring friction device is to encompass no spring-elastic auxiliary device.

4. A torsional vibration damper according to claim 1, wherein said at least one wedge comprises a wedge surface and said projection is disposed on a different side than said wedge surface.

5. A torsional vibration damper according to claim 1, wherein said at least one wedge which has a plurality of projections with gaps being formed between said projections.

6. A torsional vibration damper, comprising:

a) at least two mutually pivoted masses being mounted rotatably about an axis; and b) at least one friction device comprising a wedge having frictional surfaces and being actively disposed between said at least two mutually pivoted masses, said friction device being arranged in a chamber being partially filled with a viscous additive; wherein said friction device is rigid except for the intrinsic elasticity of said wedge and said frictional surfaces;

wherein said at least one friction device comprises at least one wedge having at least one projection that points in an axial direction.

7. A torsional vibration damper according to claim 6, further comprising a second chamber, and a spring element wherein said spring element is arranged in said second chamber.

8. A torsional vibration damper according to claim 6, wherein said friction device is to encompass no spring-elastic auxiliary device.

9. A torsional vibration damper according to claim 6, wherein said wedge comprises a wedge surface and said projection is disposed on a different side than said wedge surface.

10. A torsional vibration damper according to claim 6, wherein said at least one wedge has a plurality of projections with gaps being formed between said projections.

11. A torsional vibration damper, comprising:

a) at least two mutually pivoted masses being mounted rotatably about an axis; and b) at least one friction device actively disposed between said at least two masses, said friction device being arranged in a chamber being partially filled with a viscous additive; wherein said friction device is to encompass no spring-elastic auxiliary device;

wherein said at least one friction device comprises at least one wedge having at least one projection that points in an axial direction.

12. A torsional vibration damper according to claim 11, wherein said friction device is rigid except for an intrinsic elasticity of said wedge and said frictional surfaces.

13. A torsional vibration damper according to claim 11, further comprising a second chamber with a spring element being arranged in said second chamber.

14. A torsional vibration damper according to claim 11, wherein said at least one wedge comprises a wedge surface and said projection is disposed on a different side than said wedge surface.

15. A torsional vibration damper, comprising:

a) at least two mutually pivoted masses being mounted rotatably about an axis; and b) at least one friction device actively disposed between said at least two masses, said friction device being arranged in a chamber being partially filled with a viscous additive; wherein said friction device is to encompass no spring-elastic auxiliary device;

wherein said friction device comprises at least one wedge and has projections with gaps being formed between said projections.

16. A torsional vibration damper, comprising:

a) at least two mutually pivoted masses being mounted rotatably about an axis; and b) at least one friction device actively disposed between said at least two masses, said friction device being arranged in a chamber being partially filled with a viscous additive, and said friction device comprising at least one wedge having two wedge surfaces spaced opposite each other by a distance that varies along a surface area of said wedge, wherein said wedge comprises at least one additional surface and at least one projection which is disposed on said additional surface wherein said projection points in an axial direction.

17. A torsional vibration damper according to claim 16, wherein said at least one projection comprises a plurality of projections wherein said wedge has gaps being formed between said projections.

18. A torsional vibration damper according to claim 16, wherein said at least one projection extends to a wall of said chamber.

19. A torsional vibration damper, comprising:

a) at least two mutually pivoted masses being mounted rotatably about an axis; and b) at least one friction device actively disposed between said at least two masses, said friction device being arranged in a chamber enveloping a wedge; said chamber having a cylindrical frictional surface against which said wedge abuts; and said chamber having at least two radial walls being in frictional contact with said wedge wherein said wedge comprises at least one projection pointing in an axial direction.

20. A torsional vibration damper according to claim 19, wherein said wedge has a plurality of projections with at least one gap being formed between said projections.

21. A torsional vibration damper according to claim 20, wherein said plurality of projections extend to a wall of said chamber.

22. A torsional vibration damper, comprising:

a) at least two mutually pivoted masses being mounted rotatably about an axis; and b) at least one friction device actively disposed between said at least two masses, said friction device being arranged in a chamber; said chamber being covered by a sheet at least on one axial side wherein said at least one friction device comprises at least one wedge having at least one projection that points in an axial direction.

23. A torsional vibration damper according to claim 22, wherein said sheet has a flanged edge.

24. A torsional vibration damper according to claim 23, wherein said sheet is fixed on one of said at least two masses by said flanged edge.

25. A torsional vibration damper according to claim 23, wherein said flanged edge forms a radial frictional contact between said sheet and said at least one of said at least two masses.

26. A torsional vibration damper, comprising:
at least two mutually pivoted masses comprising a primary mass and a secondary mass;
at least one friction device actively disposed between said at least two mutually pivoted masses and including at least one entraining wedge having at least one projection that points in an axial direction;
a sheet coupled to said primary mass and being fixed to said primary mass;
a sheet coupled to said secondary mass and being fixed to said secondary mass;
at least two frictional surfaces for frictionally coupling said at least two mutually pivoted masses together via said at least one friction device and wherein at least a first frictional surface of said at least two frictional surfaces is either directly or indirectly formed on said primary mass and wherein at least a second frictional surface of said at least two frictional surfaces is either directly or indirectly formed on said secondary mass wherein said first of said at least two is formed on said sheet coupled to said primary mass and said second frictional surface is formed on said sheet coupled to said secondary mass wherein said at least one entraining wedge is disposed between said at least two opposed frictional surfaces and is frictionally coupled to at least one of said at least two frictional surfaces,
said entraining wedge comprising at least two wedge surfaces, with a first of said two wedge surfaces frictionally engaging said first frictional surface and a second frictional surface of said two wedge surfaces frictionally engaging said second frictional surface.

27. The torsional vibration damper as in claim 26, wherein said at least one entraining wedge has at least one partially cylindrical wedge surface with a radius corresponding to a corresponding surface area of said at least one frictional surface.

28. The torsional vibration damper as in claim 26, wherein said at least one wedge surface, and said at least one of said at least two frictional surfaces is substantially cylindrical in an area of interaction between said at least one wedge surface and at least one of said at least two frictional surfaces.

29. A torsional vibration damper, comprising:
a) at least two mutually pivoted masses comprising a primary mass and a secondary mass;
b) at least one friction device actively disposed between said at least two mutually pivoted masses and comprising a spring friction device linking said at least two mutually pivoted masses together wherein said at least one friction device comprises at least one wedge having at least one projection that points in an axial direction; and
c) at least one additional frictional device including at least one entraining wedge disposed between said at least two mutually pivoted masses whereby said entraining wedge comprises two wedge surfaces being parallel to said rotational axis, a first of said two wedge surfaces being an inner surface and wherein said second of said two wedge surfaces being an outer surface whereby a distance between said two wedge surfaces varies; at least two friction surfaces, wherein said two wedge surfaces are in frictional contact with said at least two friction surfaces, whereby at least a first frictional surface of said at least two friction surfaces is either directly or indirectly formed on said primary mass and wherein at least a second friction surface of said at least two friction surfaces is either directly or indirectly formed on said secondary mass.

30. The torsional vibration damper as in claim 29, wherein a distance between said two wedge surfaces varies circumferentially.

31. The torsional vibration damper as in claim 29, wherein a frictional surface of said at least two frictional surfaces is either directly or indirectly formed on said primary mass and wherein at least a second frictional surface of said at least two frictional surfaces is either directly or indirectly formed on said secondary mass, with said first wedge surface frictionally engaging said first frictional surface, and said second wedge surface frictionally engaging said second frictional surface.

32. The torsional vibration damper as in claim 31, wherein a distance of said frictional surfaces varies corresponding to a variation of said distance between said two wedge surfaces.

33. A torsion vibration damper comprising:
a) at least two mutually pivoted masses being mounted rotatably about an axis;
b) at least one frictional device actively disposed between said at least two mutually pivoted masses, and comprising a spring device linking said at least two mutually pivoted masses together wherein said at least one friction device comprises at least one wedge having at least one projection that points in an axial direction;
c) at least one additional frictional device including at least one entraining wedge disposed between said at least two mutually pivoted masses, said entraining wedge comprising two wedge surfaces; and
d) at least two frictional surfaces for frictionally coupling said at least two mutually pivoted masses together via said entraining wedge, whereby at least a first frictional surface of said at least two frictional surfaces is either directly or indirectly formed on said primary mass and in frictional contact with a first of said two wedge surfaces, and whereby at least a second frictional surface of said at least two frictional surfaces is either directly or indirectly formed on said secondary mass and in frictional contact with a second of said two wedge surfaces, wherein a distance between said two frictional surfaces varies circumferentially.

* * * * *